United States Patent Office 3,104,165
Patented Sept. 17, 1963

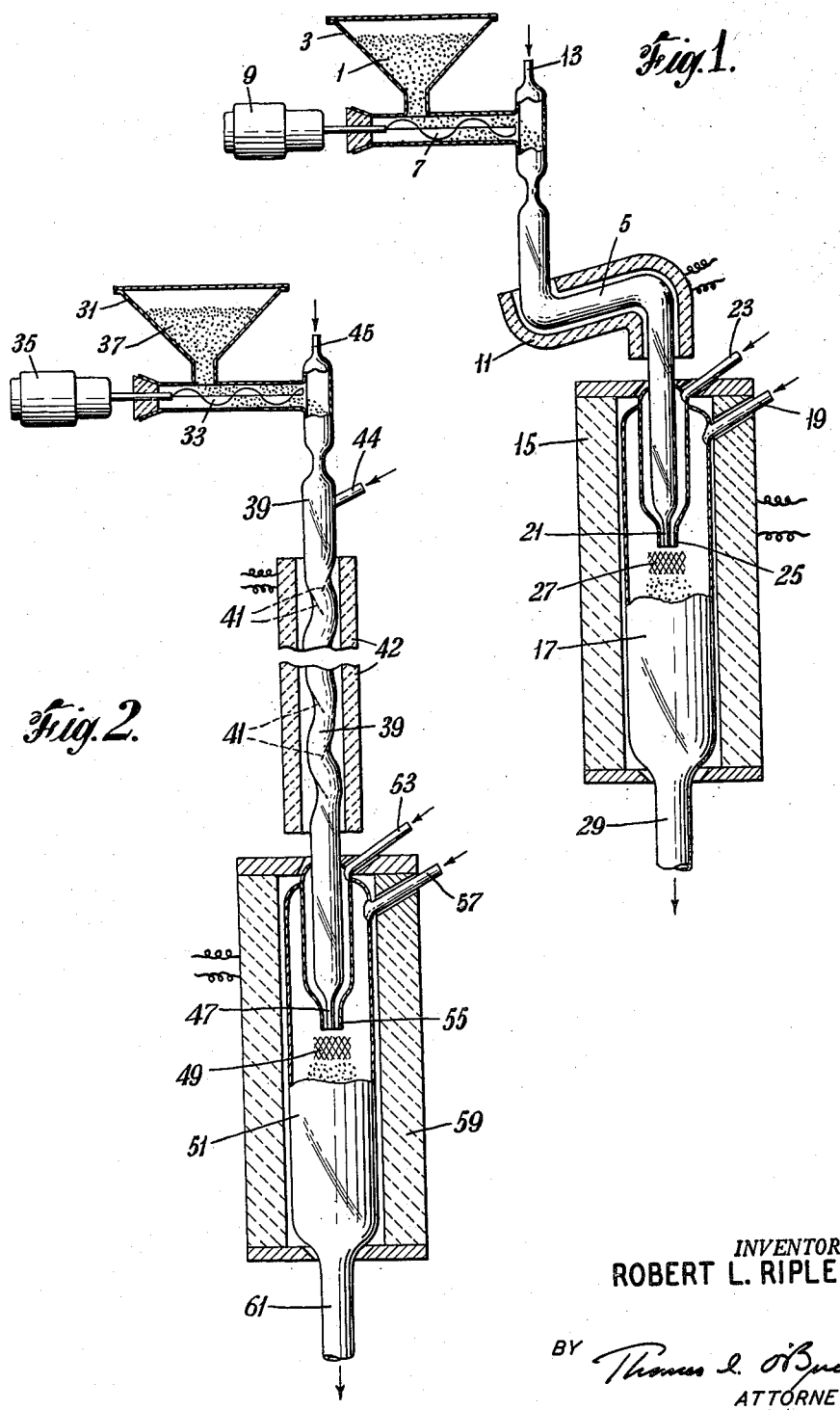

3,104,165
PROCESS FOR PRODUCING ULTRAFINE
METAL PARTICLES
Robert L. Ripley, Lockport, N.Y., assignor to Union
Carbide Corporation, a corporation of New York
Filed Nov. 10, 1960, Ser. No. 68,569
17 Claims. (Cl. 75—84.5)

The present invention relates to an improved process for the production of ultrafine particles of iron, vanadium, columbium, tantalum, chromium, moylbdenum and tungsten. Metal powders obtained in the practice of the present invention have a grain size of less than about 0.1 micron.

Powders of the metals of the aforesaid group have previously been obtained by grinding hydrided dendrites of electrolytically reduced metals or, particularly with respect to tungsten, through hydrogen reduction of the oxide. These techniques have been found to be costly and time consuming, and the particle size obtainable is most often greater than 1.0 micron.

Another more recent technique, disclosed in the U.S. patent application 68,446, filed November 10, 1960, and now abandoned, to Brutvan, Ripley and Seklemian filed of even date, is a process for the production of ultrafine metal powders which comprises injecting a stream of halide vapor corresponding to the metal to be produced into a reaction zone located within a reactor and spaced away from the surfaces thereof, sheathing the halide vapor with a co-current stream of non-reactive gas; contacting the halide vapor with a gaseous reducing agent in the reaction zone; and supplying sufficient thermal energy to the halide vapor and reducing agent to provide a sustained metal-producing reaction in the reaction zone.

While the above-described Brutvan et al. process provides for the production of relatively large and economically significant quantities of ultrafine metal powders, it has been observed that, after extended periods of process operation, the flow of the injected streams of vapor and shield gas into the reactor are impeded by interfering metal deposits to the extent that at least temporary discontinuance of the process is necessitated. This shortcoming imposes a significant economic penalty on the production of ultrafine metal powder.

Accordingly it is an object of this invention to provide process for the production of ultrafine particles of iron, vanadium, columbium, tantalum, chromium, molybdenum and tungsten, having an average particle diameter less than about 0.1 micron.

It is another object of the present invention to provide an improved process for the production of ultrafine metal powders of iron, vanadium, columbium, tantalum, chromium, molybdenum and tungsten in which continuous and uninterrupted production of ultrafine metal powder is achieved.

Other objects of this invention will be apparent from the drawing and from the following description and claims.

In the drawing:

FIGURE 1 shows, in section, an elevational view of an apparatus for the production of ultrafine metal powders.

FIGURE 2 illustrates a modification of the apparatus of FIGURE 1.

A process in accordance with the present invention for the production of ultrafine metal powder of a metal selected from the group consisting of iron, vanadium, columbium, tantalum, chromium, molybdenum and tungsten comprises injecting a stream of halide vapor corresponding to the metal to be produced into a reaction zone located within a reactor and spaced away from the surfaces thereof; sheathing the halide vapor stream with a co-current stream of gaseous halogen; contacting the halide vapor with a gaseous reducing agent in the reaction zone; and supplying sufficient thermal energy to the halide vapor and gaseous reducing agent to provide a sustained metal producing reaction in the reaction zone. Additionally, in a further modification of the present invention, a quantity of gaseous halogen is admixed with the halide vapor prior to the injection thereof into the reactor.

The process of the present invention is different from, and constitutes an improvement over the above-mentioned Seklemian et al. process in that a stream of gaseous halogen is provided for sheathing the halide vapor; and in a further modification, a quantity of gaseous halogen is admixed with the halide vapor prior to the injection thereof into the reaction zone. The use of halogen gas, in place of non-reactive gas, provides superior sheathing since any reducing gas tending to penetrate the sheathing stream is converted to by-product halide and hence cannot cause premature reduction of the halide vapor. Further the sheathing halogen gas and admixed halogen gas prevent the formation of interfering metallic deposits by re-halogenating any such incipient metal formations.

In a specific embodiment of the process of the present invention for the production of ultrafine tungsten powder, a reactor is provided and pre-heated hydrogen gas is introduced into the reactor. A pre-heated stream of tungsten hexachloride vapor, and a sheathing stream of gaseous halogen, such as chlorine, are injected downward through concentric nozzles into a portion of the reactor, designated herein as the reaction zone, which is spaced away from the surfaces of the reactor. An additional quantity of gaseous halogen, e.g. chlorine, is admixed with the halide vapor prior to the injection thereof into the reactor. The pre-heated reactants, at a temperature between about 450° C. and 1300° C., provide a self-initiated and self-sustaining metal powder-producing reaction within the reaction zone. The chlorine gas shields the halide vapor stream from the surfaces of the reactor and from contact with the reducing gas thereby forestalling any metal forming reaction of the halide until the contact thereof with reducing gas in the reaction zone. The employment of a gaseous halogen as the sheathing gas eliminates any tendency toward the formation of solid metal at the rim of the sheath gas nozzle since any incipient metal deposits are re-chlorinated. Further, the addition of a gaseous halogen, such as chlorine, to the halide vapor prior to the injection thereof into the reactor eliminates any tendency toward the formation of solid metal which might plug the halide vapor nozzle.

The use of a gaseous halogen as the sheathing gas in the present invention, and the admixing of a gaseous halogen with the halide vapor provides an ultrafine metal powder-producing process which can be practiced continuously and efficiently since the formation of metal deposits which could interfere with the injection of halide vapor and sheath gas into the reaction zone is avoided, and further, since any metal which tends to pass upward or outward from the reaction zone is re-halogenated to form halide vapor.

The ultrafine tungsten powder-producing reaction of the above-described embodiment is evidenced by a "flame" in the reaction zone, i.e. spaced away from the surfaces of the reactor and spaced below the concentric sheath gas and vapor nozzles. The position of the "flame" and hence of the reaction zone, can be maintained away from the nozzles by adjusting the velocities of the sheathing gas and halide vapor; increasing the velocities tends to increase the separation of the "flame" from the nozzles.

The above-described embodiment of the process of the present invention is efficiently conducted in the apparatus of FIGURE 1.

With reference to FIGURE 1, a quantity of solid metal halide 1, for example tungsten hexachloride is placed in an air-tight hopper 3. The solid metal halide is fed into halide vaporizing zone 5 by a screw-feed mechanism 7 driven by a motor 9 which is adapted to control the rate at which halide is fed into the vaporizing zone. A suitable furnace 11 is provided to maintain a temperature in the vaporizing zone which will ensure rapid transfer of halide into the vapor state. A halogen gas, for example chlorine, which may be admixed with an inert gas, is fed through inlet 13 to mix with the metal halide vapor and additionally to prevent diffusion of the halide vapor into the halide feed mechanism. Hydrogen reducing gas, pre-heated to between 450° C. and 1300° C. by reaction furnace 15 is introduced downwardly into the reaction chamber of reactor 17 through reducing gas inlet 19 and provides a hydrogen reducing atmosphere in the reactor. The mixture of halogen gas and halide vapor likewise pre-heated to between 450° C. and 1300° C., is injected downwardly through vapor nozzle 21 into the tubular reaction chamber of reactor 17. A sheathing co-current stream of halogen gas such as chlorine is introduced through inlet 23 and injected into the reaction chamber of reactor 17 through annular nozzle 25 which surrounds vapor nozzle 21. This stream of chlorine gas provides what may be described as an envelope or sheath for the halide vapor and the halide vapor is thereby caused to contact the hydrogen reducing gas in reaction zone 27 which is spaced away from the surfaces of the reactor and below the nozzles. The contact between the pre-heated halide vapor and pre-heated hydrogen promotes a self-initiating and self-sustaining metal powder-forming reaction which is evidenced by a flame in the reaction zone spaced away from the surfaces of the reactor and below the nozzles.

The co-current streams of shield gas and halide vapor are adjusted so that between the nozzles 21 and 25, and the reaction zone 27 the halide vapor is shielded from the surfaces of the reactor by halogen gas and by-product halide gas whereby the metal powder-forming reaction is forestalled until the halide vapor is contacted by the reducing gas in the reaction zone 27.

Ultrafine particles of tungsten are produced in the reaction zone by the reaction between hydrogen and halide vapor and the thus produced ultrafine particles exit through outlet 29. Since the flow of reducing gas, halide vapor and shielding gas are all substantially co-current, the metal particles are rapidly swept from the reactor and can be readily collected by suitable collecting means.

In the apparatus of the drawing, the tubular reaction chamber of reactor 17 is arranged having a diameter at least about three times that of the sheath gas nozzle; and concentric nozzles 21 and 25 are spaced away from the surfaces of the reactor and extend downward into approximately the center of the reactor. In this manner suitable pre-heating of the reactants by furnace 15 is provided and a self-sustaining tungsten powder-forming reaction is promoted between the tungsten hexachloride and hydrogen in the reaction zone. In the production of tungsten powder, a "flame" evidencing the metal powder-producing reaction may be observed in the reaction zone, spaced away from the surfaces of the reactor and below the nozzles.

Particular advantages are provided in the above-described preferred embodiment of the present invention which result from the employment of chlorine, or other gaseous halogen as the sheathing gas, and from the mixing of chlorine, or other gaseous halogen, with the metallic halide vapor prior to the injection thereof into the reaction zone. The use of chlorine as the sheathing gas prevents the possible formation of a metal deposit at the rim of the halide vapor nozzle, and the mixing of chlorine with the incoming halide vapor prevents the possible formation of a metal deposit within the halide vapor nozzle since any such incipient metallic deposits will be re-chlorinated either by the sheathing or admixed chlorine. Further, any metal which tends to pass upward or outward from the vicinity of the reaction zone is likewise re-chlorinated. Accordingly, the above-described process provides efficient and continuous production of ultrafine metal powders.

In the production of ultrafine metal powders in accordance with the present invention, the quantity of reducing gas is regulated to be equal to or greater than that which is thermodynamically required to produce, upon reaction with the halide vapor, a metal powder having a predetermined desired metal halide content; the metal halide content of the ultrafine powder decreases with an increasing ratio of reducing gas to halide vapor. In the production of tungsten powder, a mole ratio of hydrogen to tungsten hexachloride above 3 is suitable; however the preferred mole ratio of hydrogen to tungsten hexachloride is about 9, at which value high grade ultrafine tungsten powder is efficiently produced. It is to be understood that an amount of reducing gas, in addition to the above, is required to make up for the reducing gas which reacts with the sheathing halogen gas to form by-product halide.

The following Example I will serve to illustrate the above-described preferred embodiment of the present invention:

*Example 1*

Employing the apparatus illustrated in FIGURE 1, 1.56 grams per minute of tungsten hexachloride were fed into the halide vaporizing zone to provide tungsten hexachloride vapor at the rate of 3.92 millimols per minute through the halide vapor nozzle and into the reaction zone. In order to prevent back diffusion of the halide into the screw-feed mechanism, argon was fed into inlet 13 at the rate of 190 milliliters per minute. Chlorine gas was also introduced through inlet 13 and added to the halide vapor at the rate of 200 milliliters per minute, or 8.19 millimols per minute (calculated at 25° C. and 1 atmosphere). The chlorine was added in an amount sufficient to prevent the formation of any reduced metal in the halide vapor nozzle. Additional chlorine gas was injected into the reaction chamber through the annular nozzle 25 at a rate of 300 milliliters per minute, or 12.3 millimols per minute (calculated at 25° C. and 1 atmosphere). This additional chlorine, sheathed the halide vapor between the nozzles and the reaction zone and prevented the formation of any reduced metal at the rim of the halide vapor nozzle. Hydrogen, the reducing gas, was fed into the reaction chamber at the rate of 1800 milliliters per minute or 73.5 millimols per minute (calculated at 25° C. and 1 atmosphere). The halide vapor and hydrogen, pre-heated to about 800° C., mixed and reacted in the reaction zone. The reduced ultrafine metal particles and the by-product hydrogen chloride gas formed in the reaction chamber were carried by excess chlorine gas and argon to a collector bag. A metal recovery of above 99 percent was achieved.

Analysis of the product showed 0.5 percent oxygen, 0.16 percent chlorine, balance tungsten. The surface area measured 12.6 (microns)$^2$ per gram, equivalent to 0.025 micron, average diameter.

In a further embodiment of the present invention for the production of ultrafine metal powders, high-purity metal halide starting material is provided by converting metal powder directly to volatile halide and then reacting the thus produced halide vapor with a reducing gas to produce ultrafine powder.

With reference to FIGURE 2, a suitable hopper 31 screw-feed mechanism 33, and motor 35, similar to those illustrated in FIGURE 1, are provided and a metal powder 37, for example hydrogen-reduced tungsten is placed in the hopper. The tungsten powder is fed into vertically extending chlorinator tube 39 which is provided with a series of inwardly and downwardly projecting baffle plate 41 fixedly positioned along the length of tube 39. These baffle plates prevent the hydrogen-reduced tungsten powder from falling unreacted into the reactor. A suitable furnace 42 is arranged around tube 39 to provide an elevated temperature within the tube so that the hydrogen-reduced tungsten powder is efficiently chlorinated and vaporized. Chlorine gas is fed through inlet 44 and reacts with the hydrogen-reduced tungsten to produce tungsten hexachloride. A small amount of inert gas, such as argon is fed through inlet 45 to prevent chlorine from diffusing into the tungsten powder feed mechanism. The halide vapor, together with an excess of chlorine gas, is injected through nozzle 47 into reaction zone 49 which is spaced away from the surfaces of reactor 51. A co-current sheathing stream of chlorine is introduced through inlet 53 and injected into the reactor through annular nozzle 55. The co-current stream of chlorine gas sheaths the halide vapor between the nozzles and the reaction zone. Hydrogen reducing gas is fed downwardly into the reactor through inlet 57, and a sustained metal powder-forming reaction is promoted in the reaction zone between the halide vapor and reducing gas, which are pre-heated to between about 450° C. and 1300° C. by reaction furnace 59, and ultrafine tungsten powder is produced in reaction zone 49 spaced away from the surfaces and structure of the reactor. The ultrafine tungsten powder produced in the reaction zone exits through outlet 61.

The following Example II will illustrate this further embodiment of the present invention.

*Example II*

Employing the apparatus described in FIGURE 2, 1.48 grams per minute or 8.05 millimols per minute of —200 mesh tungsten powder were introduced by the screw-feed mechanism into the chlorinator. Simultaneously, chlorine gas was fed into the chlorinator at the rate of 600 milliliters per minute, or 24.5 millimols per minute (calculated at 25° C. and 1 atmosphere). An excess of chlorine was available in an amount sufficient to prevent the formation of any reduced metal in the halide vapor nozzle. The tungsten chloride formed in the chlorinator, mixed with chlorine gas, was injected into the reaction chamber through the halide vapor nozzle. Hydrogen, the reducing gas, was fed into the reactor at the rate of 2600 milliliters per minute or 106 millimols per minute (calculated at 25° C. and 1 atmosphere). Additional chlorine gas was injected into the reactor through the annular nozzle at a rate of 300 milliliters per minute or 12.2 millimols per minute (calculated at 25° C. and 1 atmosphere). This additional chlorine, sheathed the halide vapor between the nozzles and the reaction zone and prevented the formation of any reduced metal at the rim of the halide vapor nozzle. The halide vapor and hydrogen, preheated to about 800° C., mixed and reacted in the reaction zone; the reaction was evidenced by a flame which appeared spaced below the nozzles and spaced away from the surfaces and structure of the reaction chamber. The reduced tungsten metal particles and hydrogen chloride gas formed in the reaction chamber exited therefrom and the tungsten metal particles were collected and analyzed. Analysis of the tungsten powder showed 0.27 percent oxygen, 0.29 percent chlorine, balance tungsten. The surface area measured 12.8 (microns)$^2$ per gram, equivalent to 0.024 micron average diameter.

In the production of ultrafine tungsten powders in accordance with the present invention, when employing tungsten hexachloride, the operating temperature, i.e. temperature of the reactants, should not be less than about 450° C. When operating at temperatures below this minimum range, the reaction is slow and further, excessive amounts of enveloping or shielding gas are required to prevent the formation of particles larger than about 0.1 micron average diameter. The upper limit of the operating temperature of the reaction zone is approximately 1300° C., since temperatures in excess of this limit tend to cause the formation of some particles larger than 0.1 micron average diameter owing to the grain growth of tungsten formed in the process. The practical upper limit of temperature, however, is governed by the working temperatures of materials of construction. For best operation, in an apparatus constructed entirely of quartz, the optimum operating temperature was found to be around 700–900° C. In the production of tungsten and other metals in the process of the present invention thermal energy is supplied to the reactants to provide a metal producing reaction at a temperature above that at which the reactants are volatile and below that at which melting of the desired ultrafine metal powder occurs. Preferably, the operating temperature is maintained below the sintering temperature of the metal powder.

Although the above description has related particularly to the production of ultrafine tungsten powder, it is to be understood that the present invention can also be employed in the production of ultrafine powders of iron, vanadium, columbium, tantalum, chromium, and molybdenum. Further, in addition to hydrogen, other materials may be employed as reducing gases in the practice of the present invention; these materials include the volatile metals of groups IA, IIA and IIB of the periodic table. There are however, certain criteria which must be observed in the selection of these metals. These are as follows:

(1) The reducing metal must form a more stable halide than the metal being produced.

(2) The reducing metal must volatilize at a temperature below that at which any reaction might occur with the materials of construction of the apparatus.

(3) The reducing metal must form a halide which volatilizes below the sintering temperature of the produced powder.

In accordance with the above stated requirements, zinc and cadmium are suitable reducing agents. While hydrogen is the preferred reductant for the production of ultrafine powders of tungsten, molybdenum, columbium and tantalum, zinc is effective for the production of ultrafine powders of iron, vanadium and chromium. It is to be understood that the metallic reducing metals described hereinabove are employed in gaseous form.

The sheathing gases to be employed in the present invention are the halogens in gaseous form; however, chlorine is the preferred gas for this purpose.

The metal powders produced in the practice of the present invention have an average grain size of less than about 0.1 micron; and through the practice of the present invention it is possible to produce continuously, in commercially practical quantities, ultrafine powders of iron, chromium, molybdenum, tungsten, vanadium, columbium and tantalum which have utility in the fabrication of metal articles by powder metallurgical techniques and which are also useful in the dispersion hardening of super-strength alloys.

The periodic table referred to in the above description is that which appears in Fundamental Chemistry, 2nd, edition, by H. G. Deming, J. Wiley and Sons.

What is claimed is:

1. In a process for producing ultrafine particles of a metal selected from the group consisting of iron, vanadium, columbium, tantalum, chromium, molybdenum and tungsten by injecting a stream of halide vapor corresponding to the metal to be produced into a reaction zone located within a reactor and spaced away from the surfaces thereof; and contacting said halide vapor with a gaseous reducing agent in said reaction zone to provide a metal powder-producing reaction, the improvement in combination therewith which comprises sheathing said stream of halide vapor with a co-current stream of halogen gas.

2. In a process for producing ultrafine particles of a metal selected from the group consisting of iron, vanadium, columbium, tantalum, chromium, molybdenum and tungsten by injecting a stream of halide vapor corresponding to the metal to be produced into a reaction zone located within a reactor and spaced away from the surfaces thereof; and contacting said halide vapor with a gaseous reducing agent in said reaction zone to provide a metal powder-producing reaction, the improvement in combination therewith which comprises sheathing said stream of halide vapor with a co-current stream of halogen gas; and admixing halogen gas with said halide vapor prior to the injection thereof into said reactor.

3. In a process for producing ultrafine particles of tungsten by injecting a stream of tungsten hexachloride vapor into a reaction zone located within a reactor and spaced away from the surfaces thereof; and contacting the tungsten hexachloride vapor with hydrogen in said reaction zone to provide a tungsten powder-producing reaction in said reaction zone, the improvement in combination therewith which comprises sheathing said stream of halide vapor with a co-current stream of chlorine gas.

4. In a process for producing ultrafine particles of tungsten by injecting a stream of tungsten hexachloride vapor into a reaction zone located within a reactor and spaced away from the surfaces thereof; and contacting the tungsten hexachloride vapor with hydrogen in said reaction zone to provide a tungsten powder-producing reaction in said reaction zone, the improvement in combination therewith which comprises sheathing said stream of halide vapor with a co-current stream of chlorine gas; admixing chlorine gas with said halide vapor prior to the injection thereof into said reactor.

5. In a process for producing ultrafine particles of molybdenum by injecting a stream of molybdenum halide vapor into a reaction zone located within a reactor and spaced from the surfaces thereof; and contacting said molybdenum halide vapor with hydrogen in said reaction zone to provide a molybdenum powder-producing reaction in said reaction zone, the improvement in combination therewith which comprises sheathing said stream of halide vapor with a co-current stream of halogen gas.

6. In a process for producing ultrafine particles of molybdenum by injecting a stream of molybdenum halide vapor into a reaction zone located within a reactor and spaced from the surfaces thereof; and contacting said molybdenum halide vapor with hydrogen in said reaction zone to provide a molybdenum powder-producing reaction in said reaction zone, the improvement in combination therewith which comprises sheathing said stream of halide vapor with a co-current stream of halogen gas; and admixing halogen gas with said halide vapor prior to the injection thereof into said reactor.

7. In a process for producing ultrafine particles of columbium by injecting a stream of columbium halide vapor into a reaction zone located within a reactor and spaced from the surfaces thereof; and contacting said columbium halide vapor with hydrogen in said reaction zone to provide a columbium powder-producing reaction in said reaction zone, the improvement in combination therewith which comprises sheathing said stream of halide vapor with a co-current stream of halogen gas.

8. In a process for producing ultrafine particles of columbium by injecting a stream of columbium halide vapor into a reaction zone located within a reactor and spaced from the surfaces thereof; and contacting said columbium halide vapor with hydrogen in said reaction zone to provide a columbium powder-producing reaction in said reaction zone, the improvement in combination therewith which comprises sheathing said stream of halide vapor with a co-current stream of halogen gas; and admixing halogen gas with said halide vapor prior to the injection thereof into said reactor.

9. In a process for producing ultrafine particles of tantalum by injecting a stream of tantalum halide vapor into a reaction zone located within a reactor and spaced from the surfaces thereof; and contacting said tantalum halide vapor with hydrogen in said reaction zone to provide a tantalum powder-producing reaction in said reaction zone, the improvement in combination therewith which comprises sheathing said stream of halide vapor with a co-current stream of halogen gas.

10. In a process for producing ultrafine particles of tantalum by injecting a stream of tantalum halide vapor into a reaction zone located within a reactor and spaced from the surfaces thereof; and contacting said tantalum halide vapor with hydrogen in said reaction zone to provide a tantalum powder-producing reaction in said reaction zone, the improvement in combination therewith which comprises sheathing said stream of halide vapor with a co-current stream of halogen gas; and admixing halogen gas with said halide vapor prior to the injection thereof into said reactor.

11. In a process for producing ultrafine particles of iron by injecting a stream of iron halide vapor into a reaction zone located within a reactor and spaced from the surfaces thereof; and contacting said iron halide vapor with zinc vapor in said reaction zone to provide an iron powder-producing reaction in said reaction zone, the improvement in combination therewith which comprises sheathing said stream of halide vapor with a co-current stream of halogen gas.

12. In a process for producing ultrafine particles of iron by injecting a stream of iron halide vapor into a reaction zone located within a reactor and spaced from the surfaces thereof; and contacting said iron halide vapor with zinc vapor in said reaction zone to provide an iron powder-producing reaction in said reaction zone, the improvement in combination therewith which comprises sheathing said stream of halide vapor with a co-current stream of halogen gas; and admixing halogen gas with said halide vapor prior to the injection thereof into said reactor.

13. In a process for producing ultrafine particles of vanadium by injecting a stream of vanadium halide vapor into a reaction zone located within a reactor and spaced from the surfaces thereof; and contacting said vanadium halide vapor with zinc vapor in said reaction zone to provide a vanadium powder-producing reaction in said reaction zone, the improvement in combination therewith which comprises sheathing said stream of halide vapor with a co-current stream of halogen gas.

14. In a process for producing ultrafine particles of vanadium by injecting a stream of vanadium halide vapor into a reaction zone located within a reactor and spaced from the surfaces thereof; and contacting said vanadium halide vapor with zinc vapor in said reaction zone to provide a vanadium powder-producing reaction in said reaction zone, the improvement in combination therewith which comprises sheathing said stream of halide vapor with a co-current stream of halogen gas; and admixing halogen gas with said halide vapor prior to the injection thereof into said reactor.

15. In a process for producing ultrafine particles of chromium by injecting a stream of chromium halide vapor into a reaction zone located within a reactor and spaced from the surfaces thereof; and contacting said chromium halide vapor with zinc vapor in said reaction zone to provide a chromium powder-producing reaction in said reaction zone, the improvement in combination therewith which comprises sheathing said stream of halide vapor with a co-current stream of halogen gas.

16. In a process for producing ultrafine particles of chromium by injecting a stream of chromium halide vapor into a reaction zone located within a reactor and spaced from the surfaces thereof; and contacting said chromium halide vapor with zinc vapor in said reaction zone to provide a chromium powder-producing reaction in said reaction zone, the improvement in combination therewith which comprises sheathing said stream of halide vapor with a co-current stream of halogen gas; and admixing halogen gas with said halide vapor prior to the injection thereof into said reactor.

17. In the production of tungsten metal by the reaction of a halide of tungsten with a gaseous reducing agent, the improved process for producing ultrafine particles of tungsten which comprises in combination reacting hydrogen-reduced tungsten powder and chlorine at an elevated temperature to produce tungsten hexachloride vapor; admixing chlorine gas with the tungsten hexachloride vapor; injecting the tungsten hexachloride vapor and chlorine mixture as a stream into a reaction zone located within a reactor and spaced away from the surfaces thereof; sheathing said stream with a co-current stream of chlorine gas; contacting the tungsten hexachloride vapor with hydrogen in said reaction zone; and supplying sufficient thermal energy to the tungsten hexachloride vapor and the hydrogen to provide a sustained metal-producing reaction in the reaction zone.

References Cited in the file of this patent

UNITED STATES PATENTS

| | | |
|---|---|---|
| 2,816,828 | Benedict et al. | Dec. 17, 1957 |
| 2,822,258 | Jordan | Feb. 4, 1958 |

FOREIGN PATENTS

| | | |
|---|---|---|
| 1,074,024 | France | Sept. 30, 1954 |